Feb. 23, 1926.　　　　　　　　　　　　　　　　1,574,169
H. N. REYNOLDS
CLEAN OUT PLUG
Filed March 17, 1924
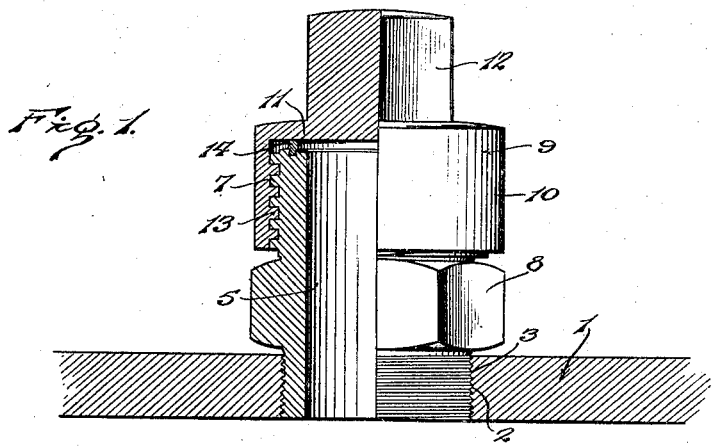
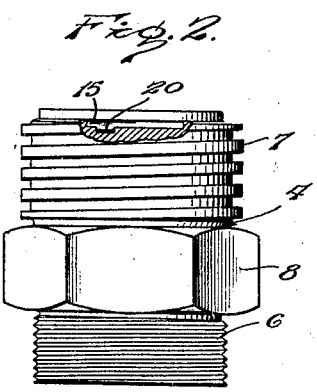
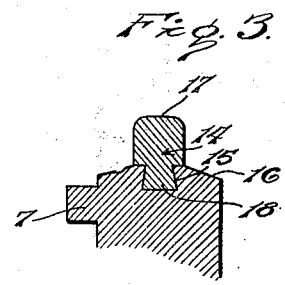
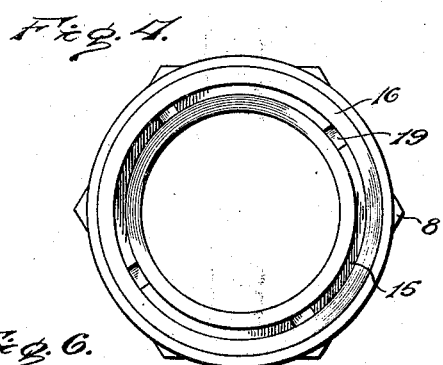
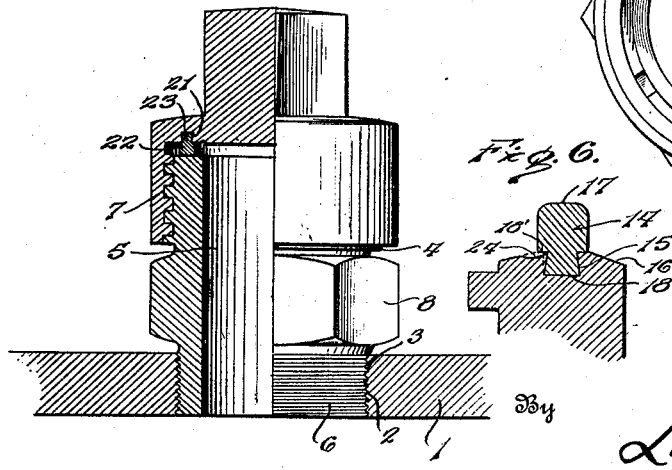
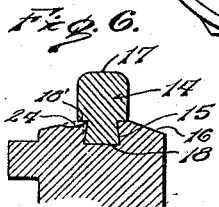
Inventor
H. N. Reynolds
By Lacey & Lacey, Attorneys Patented Feb. 23, 1926.

1,574,169

UNITED STATES PATENT OFFICE.

HARRY N. REYNOLDS, OF DETROIT, MICHIGAN.

CLEAN-OUT PLUG.

Application filed March 17, 1924. Serial No. 699,937.

*To all whom it may concern:*

Be it known that I, HARRY N. REYNOLDS, a citizen of the United States, residing at Detroit, in the county of Wayne and State of Michigan, have invented certain new and useful Improvements in Clean-Out Plugs, of which the following is a specification.

This invention relates to improvements in clean-out and similar plugs for oil stills, oil tanks, and in fact any still or tank or other apparatus or container where it might be found useful because of its peculiarities.

It has been found that the plugs of oil stills, oil tanks, and the like, will in a short while become corroded, so that when their removal becomes necessary, great difficulty is experienced in removing them without stripping the threads, thereby necessitating re-tapping of the opening in the wall of the still or tank, and the production of a plug of a diameter to fit the enlarged hole. It has heretofore been proposed to avoid the necessity of repeatedly removing the plug from the wall of an oil still or tank by employing a bushing which is threaded into the opening in the said wall and into which is threaded a plug proper, the idea being to provide for the removal of the plug without disturbing the connection of the bushing with the said wall. However, in such devices the threads upon the bushing which are to match with the threads upon the removable plug, are located interiorly of the bushing so that these threads and the threads of the plug likewise become corroded and great difficulty is experienced in removing the plug. Therefore, the present invention has as one of its important objects to provide means whereby these difficulties may be overcome, the bushing of the present invention being designed to be permanently fitted into the opening in the wall of the still or tank, and a cap being threaded onto the bushing in such a manner as to preclude any possibility of the contents of the still or tank reaching the threads by which the cap and bushing are temporarily connected, so that there can be no corrosion of the threads and the cap may be removed at any time desired without any difficulty whatsoever being experienced.

Likewise in devices of this class which have heretofore been devised, the bushing has been provided with threads adapting it to be threaded into the opening in the wall of the still or tank, and threading of the bushing into the said opening has been effected solely by fitting the plug to the bushing and then applying a wrench to the squared end of the plug and rotating the entire assemblage until the bushing is threaded into the opening. This is obviously an unsuitable method of threading the bushing into place, and therefore the present invention has as a further important object to provide means whereby the bushing may be threaded into the opening in the wall of the still or tank and so tightly fitted in place, by the use of a wrench applied directly to the bushing, as to entirely preclude any possibility of its becoming unthreaded, especially after the threads have become corroded to a greater or less extent. One of the advantages which is gained by this method of fitting the bushing to the still or tank lies in the fact that it may be more firmly threaded into place than where it is assembled with the plug and where the plug constitutes a connecting medium between the wrench and the bushing. Another advantage is that, the bushing having been more securely threaded into place than has heretofore been possible, there is no likelihood of disturbance of the connection of the bushing with the wall of the still or tank at the time the cap is threaded to the bushing or removed therefrom.

Another important object of the invention is to provide a novel form and arrangement of packing ring between the bushing and cap whereby any leakage of the contents of the still or tank such as would reach the threads uniting the cap and bushing and cause corrosion thereof, is prevented.

Likewise the invention contemplates so anchoring the packing ring as to preclude any rotative displacement thereof, so that the ring, being of softer metal than the bushing or cap, will be better adapted to contact the face of the cap or bushing, as the case may be, to effect a fluid-tight seal.

In the accompanying drawings:

Figure 1 is a view partly in side elevation and partly in section illustrating one form of the invention, the bushing being fitted at one end into an opening provided in the wall of a still or tank;

Figure 2 is a view similar to Figure 1 illustrating the bushing in elevation with a portion thereof shown in section to better illustrate the manner in which the packing ring is held against rotative displacement;

Figure 3 is a detail vertical sectional view illustrating the manner of mounting the packing ring;

Figure 4 is a plan view of one end of the bushing before the ring is fitted into place;

Figure 5 is a view similar to Figure 1 illustrating a slight modification of the invention.

Figure 6 is a view similar to Figure 3 illustrating a modification of the invention.

In the drawings the numeral 1 indicates the wall of an oil still, a storage tank, or any other apparatus or storage container in connection with which it would be desirable to employ the plug embodying the invention, and this wall is formed with an opening 2, the wall of which is formed with threads 3 which are of the V-type and relatively fine. The bushing of the device is indicated in general by the numeral 4 and constitutes an integral structure, the said bushing comprising a body formed with a longitudinal bore 5 of uniform diameter throughout, the bore opening through the ends of the bushing. One end portion of the bushing 4 is formed exteriorly with threads 6 which are of the V-type and relatively fine and are designed to match the threads 3 of the opening 2. For a purpose to be presently explained the bushing body is formed at its opposite end portion, exteriorly, with a number of threads 7 of the square type and relatively coarse, and the intermediate portion of the bushing, or, in other words, that portion lying between the threads 6 and 7, is of polygonal form exteriorly as indicated by the numeral 8, thus adapting the bushing for the application thereto of a wrench whereby the end of the bushing which is provided with the threads 6 may be securely and firmly threaded into the opening 2 and permanently fixed in said opening. As heretofore stated, it had previously been the practice to thread such a bushing into place by first applying the plug to the bushing and then applying a wrench to the plug but it will be obvious at this point that by providing the bushing with the polygonal intermediate portion 8, the bushing is adapted, as stated, for the application thereto of a wrench by the employment of which the bushing may be directly threaded into the opening in the wall 1. By exerting sufficient force upon the wrench, the bushing may be so firmly fitted into the opening 2 as to positively preclude any likelihood of its becoming loosened and, in fact, after the threads 3 and 6 have become more or less corroded, a substantially integral union is effected between the bushing and the wall 1 thus adding to the permanency of the bushing.

The plug element of the device embodying the present invention is not strictly speaking a plug in that it might be considered as being adapted to fit into the bore of the bushing, as has heretofore been done by exteriorly threading a cylindrical plug and interiorly threading the bushing, but is more specifically speaking in the nature of a cap which is indicated in general by the numeral 9 and which comprises a cylindrical wall portion 10 and a closed end or web 11 provided upon its outer face with a polygonal stud 12 adapting it for the application thereto of a wrench, the wall 10 of the cap being formed interiorly with a number of threads 13 of the square coarse type so proportioned as to match the threads 7 of the bushing 4. At this point and by reference to Figures 1 and 5 of the drawings it will be understood that after the bushing 4 has been securely mounted in the opening in the wall 1 of the still or other structure in connection with which the plug is to be employed, the cap 9 may be fitted onto the outer end portion of the bushing and firmly threaded to place by applying a wrench to the stud 12 of the said cap. By forming the threads 7 upon the exterior of the outer end portion of the bushing and forming the threads 13 upon the interior of the cap, the threads are not subjected to the corrosive action of the contents of the still or tank as is the case where the bushing is formed interiorly with such threads and the plug is formed exteriorly with matching threads. However, to positively insure against the leakage of the contents of the still or tank to the threads 7 and 13, means is provided which will now be described.

The means referred to above comprises a packing ring indicated in general by the numeral 14 and which ring is preferably of copper, brass, or any other metal or alloy suitable for the purpose and somewhat softer than the metal of which the bushing and cap are formed, and in that form of the invention shown in Figs. 1 to 4, inclusive, the upper or outer end of the bushing 4 is formed about its periphery with a circumferential groove 15 which is of dove-tail form, the said periphery of the end of the bushing having oppositely inclined surface portions 16 concentric to the open side of the said groove 15 and one circumscribed by the said groove and the other circumscribing the said groove. The packing ring 14 comprises a bearing portion 17 and an anchoring rib 18, the two being located respectively at the outer and inner sides of the said ring. The rib 18 is seated in the groove 15 and the said end of the bushing is swaged so that the said rib 18 will fill the dove-tail groove 15 and be securely anchored therein. By reference to Fig. 1 of the drawings it will be observed that when the cap 9 is firmly threaded onto the outer end portion of the bushing 4, the inner surface of the closed end 11 of the cap will firmly contact the bearing portion or surface 17 of the packing ring 14 so that a fluid-tight seal will be provided at the point of contact of the ring with the said closed end of the cap and oil or other contents of the still or tank upon which the device is mounted will be prevented from reaching the threads 7 and 13. As a consequence these threads will not become corroded, and therefore the cap 9 may be conveniently removed at any time and replaced with facility. In order to provide against rotative displacement of the ring 14, it being desirable to hold the ring against such displacement in order that the bearing surface or portion 17 may, due to the relative softness of the metal of which the ring is formed, have close frictional engagement with the inner face of the closed end 11 of the cap 9, seats 19 are formed at intervals in the bottom of the groove 15, and the ring 14 is provided at corresponding intervals upon the inner side of its rib 18 with projections 20 which are of dimensions and form to engage in the said seats 19.

From the foregoing description of that form of the invention shown in Figs. 1, 2, 3 and 4 of the drawings, it will be observed that the packing ring 14 is carried by the outer end of the bushing 4, but the ring may equally as well be carried by the closed end 11 of the cap 9 as illustrated in Fig. 5, the said end of the cap being provided with a groove 21, in this form, corresponding to the groove 15, and the packing ring, which in this figure is indicated by the numeral 22, being provided with a rib 23 corresponding to the rib 18 in the previously described form. In this modified structure, the bearing portion of the packing ring will, of course, ride in frictional contact with the end face of the wall of the bushing 4 when the cap 9 is threaded onto the bushing and form a seal in precisely the same manner as in the previously described form.

From the foregoing description and by reference to the drawings, it will be evident that the threads 6 which adapt the bushing to be fitted into the opening in the wall of the still or tank or other apparatus, and the threads 7 which adapt the bushing for the application thereto of the cap 9, are both located upon the exterior surface of the bushing, the threads 6, as previously stated, being of V-shape and relatively fine, and the threads 7 being of the square type and relatively coarse, so that no difficulty will be experienced in removing the cap from the bushing although, on the other hand, great difficulty would be experienced in loosening or removing the bushing from the still or the like into the wall of which it was initially threaded.

By reference to Figure 6 of the drawings it will be observed that the groove 15 in the periphery of the outer end of the bushing 4 may have one wall under cut and its opposite side wall substantially straight so as to permit of more ready introduction of the rib 18 into the said groove, after which the material of the bushing at its said end may be swaged or crowded to engage the adjacent side of the rib 18 and in this operation a recess may be provided beneath the shoulder 18', which recess is indicated by the numeral 24 and provides means whereby a cold chisel or the like may be engaged beneath the shoulder for the purpose of removing the packing ring.

Having thus described the invention, what is claimed as new is:

1. A plug for tanks or boilers comprising a bushing having a bore opening through the opposite ends thereof, said bushing having one end thereof provided with means adapting it to be secured in the wall of the tank, the other end of the bushing being provided with threads, there being an annular seating groove dovetail in cross section formed in the last-mentioned end of the bushing, the bottom wall of which is provided with spaced angular seats, the end of the bushing on opposite sides of said seating groove being oppositely inclined, a packing gasket having a dovetail anchoring rib fitting within the groove and provided with spaced projections engaging the angular seats, and a closure cap having threads engaging the threads on the bushing and bearing against the packing gasket.

2. A plug for tanks or boilers comprising a threaded bushing and a correspondingly threaded closure cap, one of which is provided with an annular seating groove dovetail in cross section and having its bottom wall provided with spaced seats, and a packing gasket having a dovetail anchoring rib fitting within the groove and provided with spaced projections engaging the seats whereby to prevent rotative movement of the gasket in said seating groove, the free end of the gasket by engagement with the adjacent surface of the plug serving to form a tight joint between the bushing and closure cap when said closure cap is screwed home.

In testimony whereof I affix my signature.

HARRY N. REYNOLDS. [L. S.]